(12) United States Patent
Tavernier et al.

(10) Patent No.: US 8,213,615 B2
(45) Date of Patent: Jul. 3, 2012

(54) DATA ENCODING METHOD

(75) Inventors: Cedric Tavernier, Fontenay Sous Bois (FR); Herve Aiache, Dugny (FR)

(73) Assignee: Thales, Neuilly sur Seine (FR)

( * ) Notice: Subject to any disclaimer, the term of this patent is extended or adjusted under 35 U.S.C. 154(b) by 19 days.

(21) Appl. No.: 12/524,618

(22) PCT Filed: Jan. 24, 2008

(86) PCT No.: PCT/EP2008/050815
§ 371 (c)(1),
(2), (4) Date: Dec. 1, 2009

(87) PCT Pub. No.: WO2008/095784
PCT Pub. Date: Aug. 14, 2008

(65) Prior Publication Data
US 2010/0086132 A1    Apr. 8, 2010

(30) Foreign Application Priority Data

Jan. 26, 2007  (FR) ..................... 07 00554

(51) Int. Cl.
*H04L 29/06* (2006.01)
(52) U.S. Cl. .............................. 380/255; 380/30; 380/44
(58) Field of Classification Search .................. 380/255, 380/30, 44, 277–285; 277/47
See application file for complete search history.

(56) References Cited

U.S. PATENT DOCUMENTS

| | | | | |
|---|---|---|---|---|
| 3,742,201 A | * | 6/1973 | Groginsky | 708/410 |
| 3,810,019 A | * | 5/1974 | Miller | 375/260 |
| 4,933,956 A | * | 6/1990 | Forney, Jr. | 375/341 |
| 6,295,359 B1 | * | 9/2001 | Cordery et al. | 380/44 |
| 6,941,463 B1 | * | 9/2005 | Atallah et al. | 713/190 |
| 7,346,162 B2 | * | 3/2008 | Slavin | 380/30 |
| 7,440,570 B2 | * | 10/2008 | Short | 380/44 |
| 7,643,637 B2 | * | 1/2010 | Venkatesan et al. | 380/268 |
| 2002/0044542 A1 | * | 4/2002 | Kim | 370/342 |
| 2005/0175180 A1 | * | 8/2005 | Venkatesan et al. | 380/268 |

(Continued)

FOREIGN PATENT DOCUMENTS

WO   WO 2006124289 A2 * 11/2006

OTHER PUBLICATIONS

Dumer et al, Recursive Decoding and Its Performance for Low-Rate Reed-Muller codes, May 2004.*

(Continued)

*Primary Examiner* — Jung Kim
*Assistant Examiner* — Shan Elahi
(74) *Attorney, Agent, or Firm* — Stroock & Stroock & Lavan LLP

(57) ABSTRACT

A method of encoding a piece of information circulating in a network comprising at least one information transmitting node and one recipient node, using a public key encryption system, characterized in that it comprises at least the following steps: generating a public key by using a public key generation matrix NG consisting of u columns and u rows, an element of a column or of a row being a block formed by the code generation matrix G, and by use of a public key given by the matrix PUK=RI (matrix multiplication by block) NG (matrix multiplication) RP. The private key and the public key obtained are used to encode and decode the information transmitted in the network.

8 Claims, 6 Drawing Sheets

U.S. PATENT DOCUMENTS

2005/0210364 A1* 9/2005 Kim .............................. 714/781
2008/0172233 A1* 7/2008 Smaragdis et al. ........... 704/256

OTHER PUBLICATIONS

I.I. Dumer et al, List Decoding of the First-Order Binary Reed-Muller Codes, 2007.*
Pierre et al, Weak Keys in the McEliece Public-Key Cryptosystem, Mar. 2001.*
William Luh et al, Distributed Privacy for Visual Sensor Network via Markov Shares, 2006.*
Alabbadi "Integrated Security and Error Control for Communication Networks Using the McEliece Cryptosystem", 1992.*
Ammar et al, "Reducible Rand Codes and Their Applications to Cryptography" vol. 49, No. 12, Dec. 2003.*
Boztas et al, Applied Algebra, Algebraic Algorithms and Error-Correcting Codes, AAECC-14, Nov. 2001.*
Engelbert et al, A Summary of McEliece type cryptosystems and their security, May 2006.*
Buchmann et al, "Pubic Key Cryptography based on coding theory", Apr. 2007.*
Alabbadi, et al, 1992. "Integrated security and error control for communication networks using the McEliece cryptosystem." IEEE International Carnahan Conference on Crime Countermeasures, Proceedings, Security Technology, pp. 172-178.
Ammar, et al, 2003. "Reducible rank codes and their applications to cryptography." IEEE Transactions on Information Theory 49(12): 3289-3293.
Massey, James L., 2004. "The Ubiquity of Reed-Muller Codes." <<http://www.springerlink.com/content/30q8vvg50719g6m1/>>. Last accessed Sep. 7, 2007.
Engelbert, et al, 2006. "A Summary of McEliece Cryptosystems and their Security." <<http://eprint.iacr.org/2006/162.ps>> Last accessed Sep. 6, 2007.

* cited by examiner

DATA ENCODING METHOD

CROSS REFERENCE TO RELATED APPLICATIONS

The present application is the U.S. National Phase of International Patent Application Serial No. PCT/EP2008/050815, filed on Jan. 24, 2008, which claims the benefit of French Patent Application Serial No. 07/00554, filed on Jan. 26, 2007, both of which are hereby incorporated by reference in their entireties.

BACKGROUND OF THE INVENTION

1. Field of the Invention

The present invention relates notably to an information or data encoding method. It relates, for example, to transmission security in networks. It applies, for example, in wired and wireless transmission networks.

2. Prior Art

In wireless networks, the constraints are high, there is often a low computation capacity, transmission problems (noise-affected channels) and weak flows. One of the problems encountered is how to protect the transmitted information, that is to say, how to find a solution that makes it possible to observe the anonymity of the users wishing to exchange information and guarantee that this information cannot be accessed by malicious hackers, while retaining good traffic quality, that is to say, without adding too much latency. In practical terms, it is easy for a hacker to intercept any communication in a given region, when in a wireless environment. The standard encryption systems with public keys that can be used to encrypt the address of the node of a communication network are generally very slow compared to the needs of the application. A number of solutions that use private key encryption systems are known from the prior art. These solutions do not, however, offer high security, because each node of the network must know the private key of the others. This means that, when a node is corrupted, the security of the network collapses.

The document by William Luh, Deepa Kundur, entitled "Distributed Privacy for Visual Sensor Networks via Markov Shares" In *Proceedings of the Second IEEE Workshop on Dependability and Security in Sensor Networks and Systems,* 2006, discloses a method that divides up the information before transmitting it. This solution protects the information only if it is assumed that the hacker is capable of intercepting only a small fraction of the information. This assumption is improbable in a wireless context. Another drawback of the method described is that it does not guarantee the anonymity of the users. The document by V. M. Sidel'nikov, entitled "A public-key cryptosystem based on Reed-Muller codes" *Discrete Mathematics and Applications,* 4(3):191-207, 1994, also describes a public key encryption system that uses the property of the Muller codes and retains the principle of adding a random error of fixed weight. The performance of such an algorithm is still weak when considering real-time or almost real-time applications. This article discloses an algorithm that is more restrictive. The length of the key is always important and the complexity of encryption of a message is more important if a high security is to be maintained. The public key encryption system described is probabilistic. There is therefore a non-zero probability that the recipient of the message will not succeed in decrypting the message.

Currently, the systems described in the prior art do not adequately resolve the problems of security when transmitting information in a transmission network and they do not address the problem of the anonymity of the sender and of the receiver.

SUMMARY OF THE INVENTION

One of the subjects of the invention relates to a method of encoding a piece of information circulating in a network comprising at least one information transmitting node and one recipient node, using a public key encryption system, characterized in that it comprises at least the following steps:
  a public key is generated by using a public key generation matrix NG consisting of u columns and u rows, an element of a column or of a row being a block formed by the code generation matrix G, and by executing the following operation: if RI is a random invertible matrix forming a private key and RP is a matrix obtained by random permutation forming a private key, the public key is given by the matrix PUK=RI (matrix multiplication by block) NG (matrix multiplication) RP,
  the private key and the public key obtained are used to encode and decode the information transmitted in the network.

The matrix RP is, for example, an invertible matrix RP, constructed as is follows: a permutation matrix is drawn randomly to which is added a matrix of the same dimension MA, the column vectors of which contain only a number of non-zero positions between the number 0 and a given number Pv. It comprises, for example, a step for reducing the size of the public key generation matrix by eliminating certain columns of the matrix.

The inventive method, notably because of the dimension of the matrix used for the encryption, offers the possibility of having a greater number of parameters, not dependent on the structure of the code, unlike the encoding techniques known from the prior art. The complexity of the decryption now depends linearly on the length of the constructed code, whereas in the prior art it depended directly on the decoding complexity. The inventive method therefore offers a lower complexity than that resulting from a length-based decoding. The inventive method can be implemented at the lowest level, namely the signal carrying the information exchanged between the source and the destination since there is the possibility of using an existing flexible decoding technique. There is the possibility of placing information in the error generated for encryption in order to increase the efficiency according to the method of V. M. Sidel'nikov in "A public-key cryptosystem based on Reed-Muller codes" *Discrete Mathematics and Applications,* 4(3):191-207, or even Nicolas Sendrier's method in the context of a dissertation for authorization to direct research, specialty: information technology, University of Paris 6, March 2002.

BRIEF DESCRIPTION OF THE DRAWINGS

Other features and benefits of the present invention will become more apparent from reading the following description given by way of illustration and in a non-limiting way, with appended figures which represent.

DETAILED DESCRIPTION OF THE INVENTION

Figure 7:
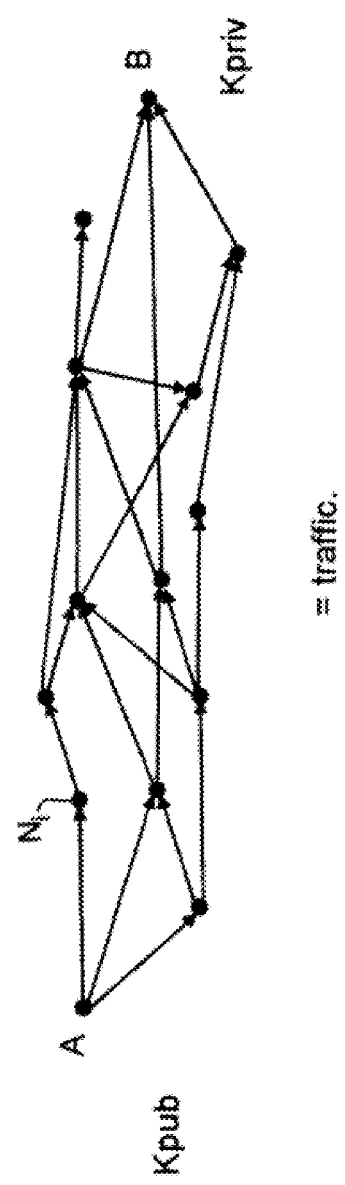

In order to better understand the principle implemented in the inventive encryption method, the example will be given, by way of illustration and in a by no means limiting manner, in the context of a network comprising a plurality of nodes, including a node A sending the encrypted information, a recipient node B or receiver of this information and a plurality of intermediate nodes Ni, as is represented in FIG. 7. The code used for this example will be the Reed-Muller code. However, without departing from the framework of the invention, the steps described hereinbelow can be applied to any code normally used for data encryption. Each of the nodes is equipped with a sending/receiving device known to those skilled in the art and which will therefore not be detailed in the present description. Each node also includes a device making it possible to execute the various steps of the inventive method, such as a processor suitable for encrypting the information to be sent and decrypting an encrypted piece of information received by a node and he address of the recipient node of the information. A node is notably provided with a random generator making it possible to generate the invertible and random matrices used in the steps of the method.

Figure 1:
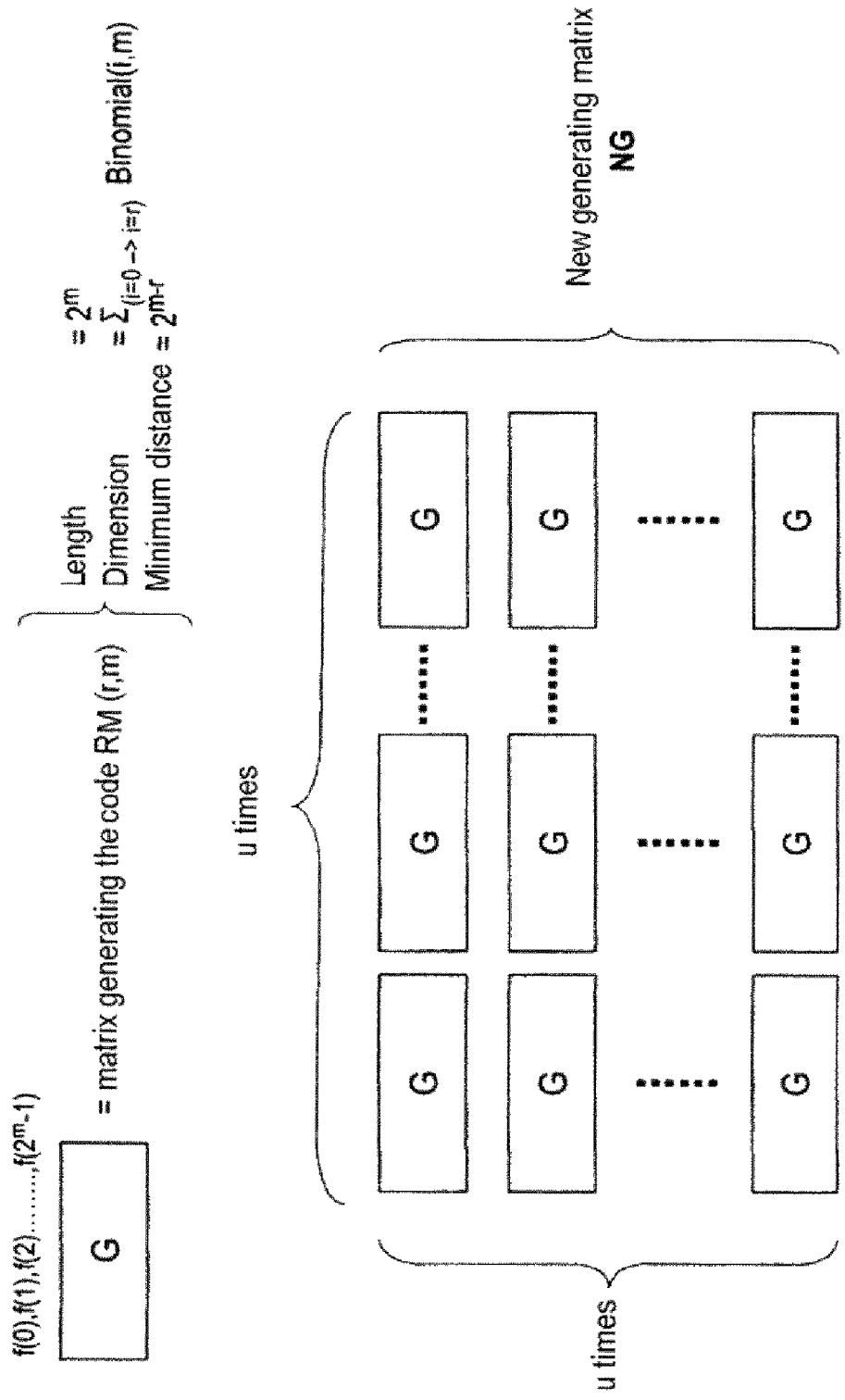
FIG. 1, generation of the encryption matrix,
  FIG. 2, generation of the public key and of the private key used in the inventive encryption method,
  FIG. 3, a scheme for reducing the length of the generated public key,
  FIG. 4, an exemplary scheme for adding an error,
  FIG. 5, an exemplary information encoding structure,
  FIG. 6, an example of information decoding, FIG. 7, an example of communication between a sender of the information and a recipient in a network comprising a plurality of nodes.

FIG. 1 represents the generation matrix NG used for the encoding or encryption of the information to be transmitted. Let C be a q-ary t-correcting linear code of length n, of dimension k, and CWq(n, t) the set of the words of $F^n_q$ of Hamming weight t. (Public key cryptosystems based on Nicolas Sendrier's error correcting codes in the context of a dissertation for authorization to direct research, specialty: information technology, University of Paris 6, March 2002.) G is a public key generating matrix, x belonging to $F^n_q$, the encryption is defined as follows:

$$y=xG+e; w_H(e)=t$$

y is a vector, e corresponds to an error of weight t which will be chosen at the time of encryption, w corresponds to the Hamming weight, the index H to the Hamming word and t to the error.

The code generation matrix according to the invention designated NG is a matrix comprising u rows and u columns. An element of the matrix consists of a block G corresponding to the initial public key generation matrix. NG therefore comprises u blocks G along a row of the matrix and also u blocks G along a column of the matrix. The matrix of the code G is a concatenation and a product of known Reed-Muller codes, for example. Since RM(r,m) has a dimension=$k=\Sigma_{(i=0->i=r)}$ binom(i,m) (with binom(i,m)=m!/(i!(m−i)!)) and a length $N=2^m$, the public key will be of dimension (u*k)*(u*N). For the decryption, it is necessary to do u decodings d_i, whereas the known methods from the prior art did only one: (d_1, d_2, ..., d_u).

The benefit of this new technique lies in the performance levels obtained and in the choice of the parameters. In practice, like that, the inventive system is more parametrable since there is a wide choice of parameters whereas, with the methods according to the prior art, these choices are imposed by the structure of the code. For example, for the Goppa codes: length $N=2^m$, dimension $k=2^m-m-t$, the complexity of the decoding algorithm depends quadratically on the length of the code, therefore the complexity to perform a decoding is lower than performing a decoding of length $2^{(m+log\_2(u))}$.

Figure 2:
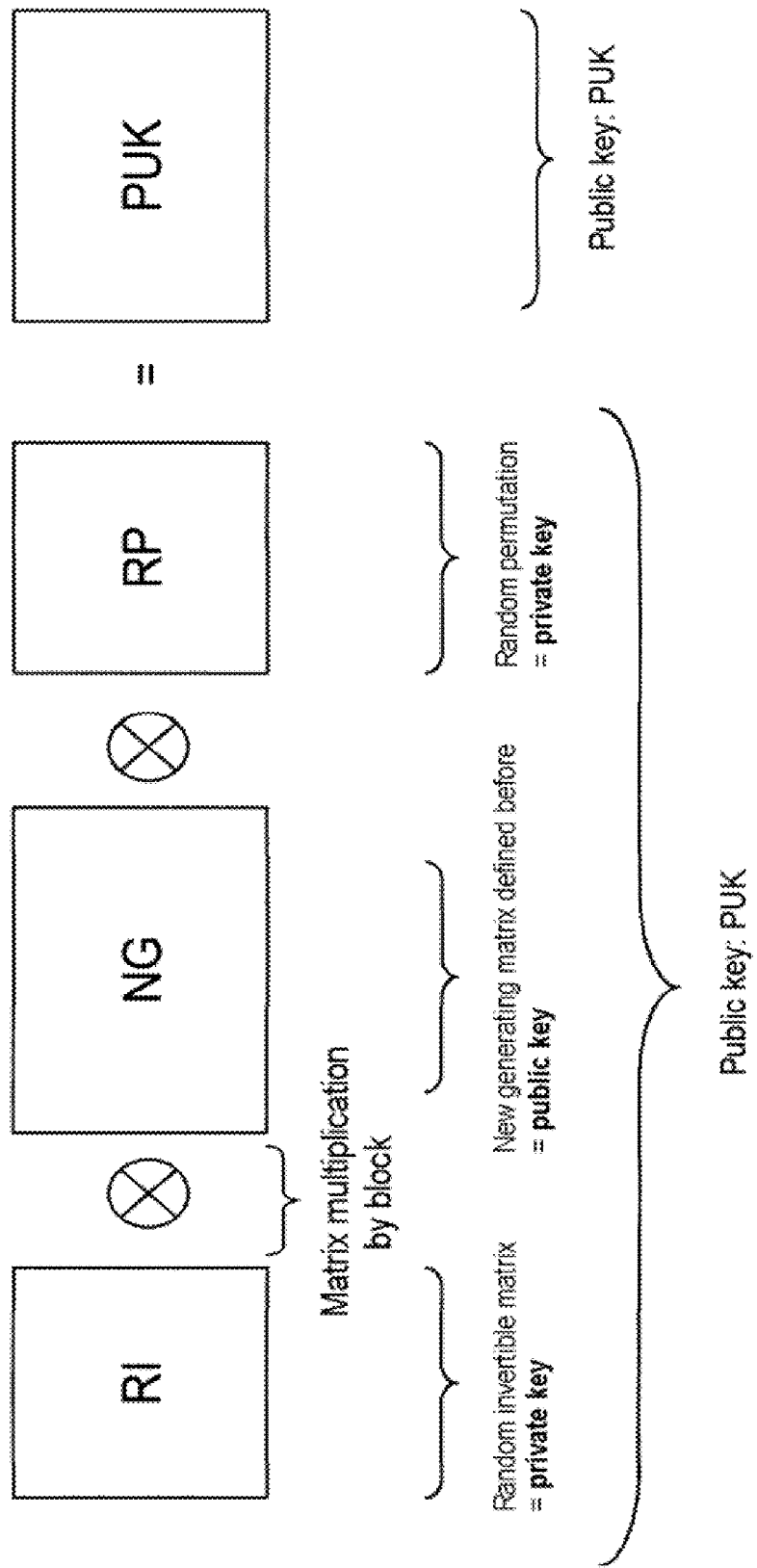

From this new matrix NG, the method constructs public keys and private keys that will be used when transmitting the message, to encrypt and decrypt the messages to be transmitted. The construction of these keys is illustrated in FIG. 2. The public key PUK used to encode the transmitted information is constructed by using a random invertible matrix RI, the new matrix NG and an invertible matrix RP, constructed, for example, as follows: a permutation matrix is drawn randomly to which is added a matrix of the same dimension MA so the column vectors contain only a bounded number of non-zero positions, between 0 and a given number Pv. Pv will be adjusted according to the desired security. If this duly constructed matrix is denoted RPI, then the matrix RP is obtained by inverting the matrix RPI (RP=RPI$^{-1}$). Therefore, if the matrix MA is zero, RP is in fact none other than a permutation matrix. The multiplication of RI with NG is a multiplication by block. The multiplication on the left of the concatenated code by an invertible matrix is a multiplication by block making it possible to obtain a matrix of rank uk. The following scheme applies:

RI (matrix multiplication by block) NG (conventional matrix multiplication)

RP=public key PUK used in the method to decrypt the information received by a node. The private key PRK used to encode the information to be transmitted at the level of a node in the method consists of RI and RP.

Dim(RI)=$u^2 \cdot (\Sigma_{(i=0->i=r)}$ Binomial(i,m))$^2$; where Binomial(i, m) is a function defined as follows (m!/(i!(m−i)!)) with m being the number of variables for the Reed-Muller code, r the order of the Reed-Muller code RM(r,m).

Dim (RP)=$u^2 \cdot (2^m)^2$;

Dim (NG)=Dim(PUK)=$(u\Sigma_{(i=0->i=r)}$Binomial(i,m))·$(u2^m)$.

Any other type of code can be used.

Figure 3:
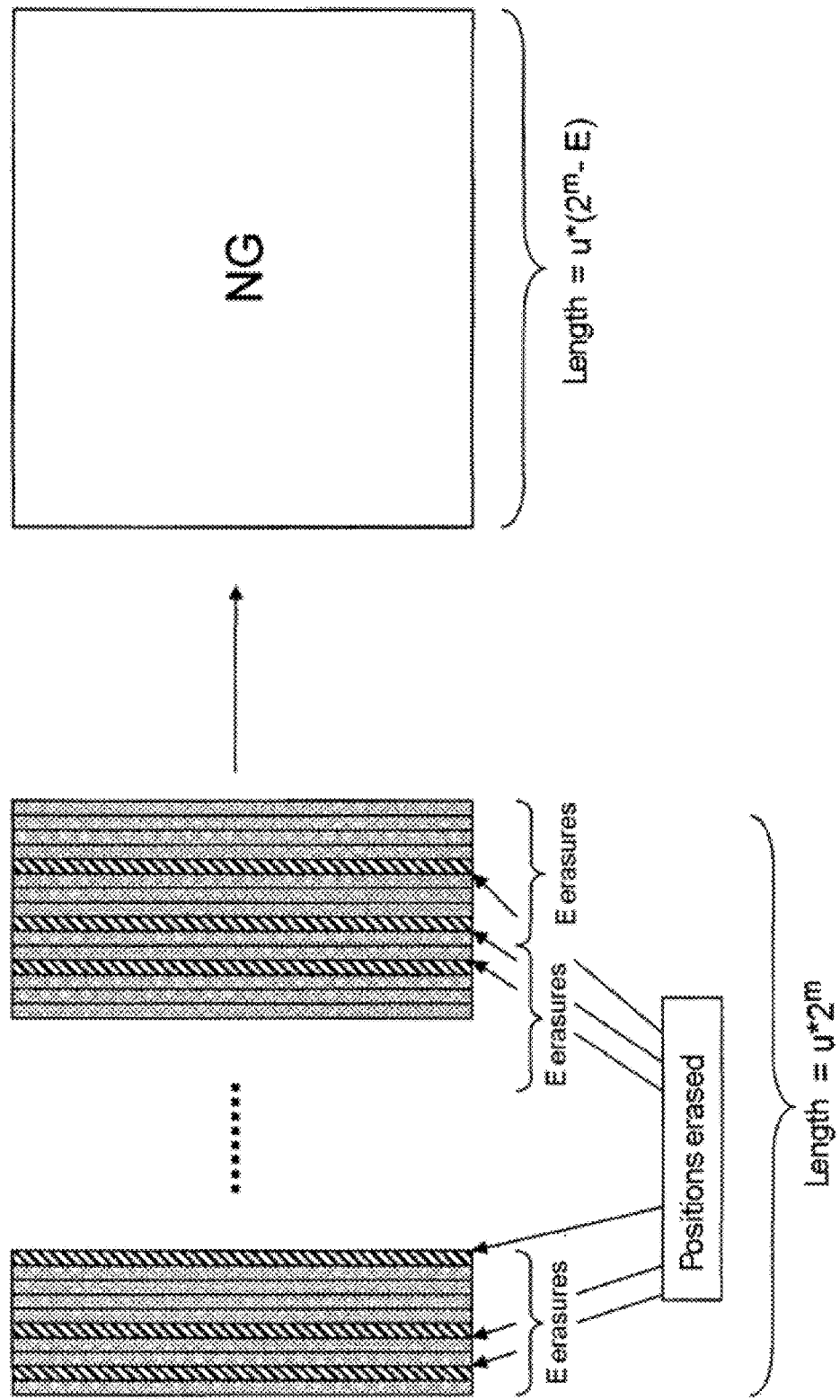

According to a variant embodiment, the method includes a step illustrated in FIG. 3 used to reduce the length of the public key generated in FIG. 2.

It consists in eliminating certain columns of the matrix. The number of is columns erased is determined, for example, according to the decoding algorithm used on receiving the transmitted information. For example, for a decoding algorithm tolerating a maximum of t errors, there are t=a constructed errors+2(erasures E) of columns. The value of the number of column erasures e is determined from t and from the desired transmission security. It is thus possible to envisage the same number of erasures for all the blocks of the matrix NG.

Figure 4:
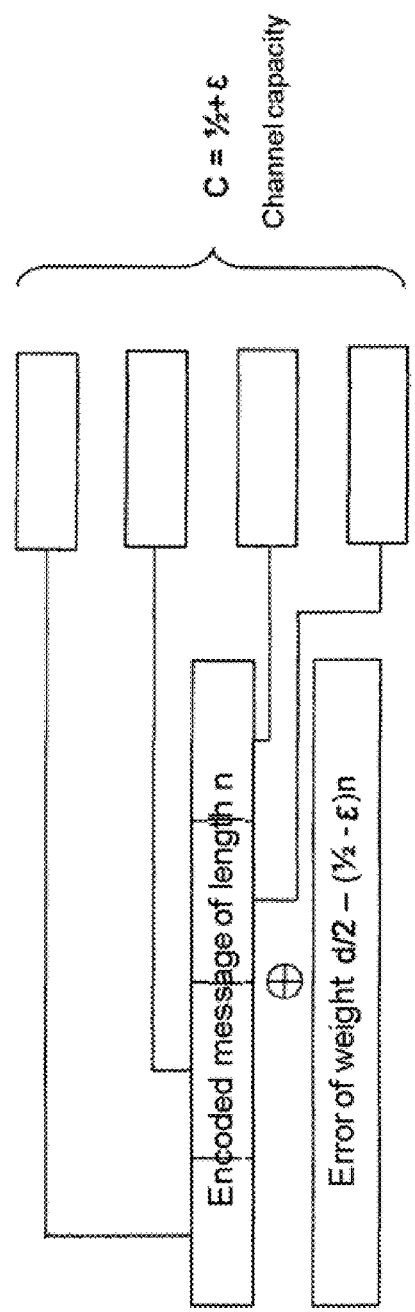

According to an embodiment, the method can add an error according to a scheme represented in FIG. 4. For this, the method dynamically evaluates (according to an algorithm known to those skilled in the art) the capacity of the channel (adaptive decoding), then, depending on the quality of the channel, the method adds random errors of fixed weight in order to set the security, from an information reconstruction point of view. The weight of this error also depends on the matrix RP. This dependency is expressed according to the average weight of the columns of the matrix RP. The higher this average weight is, the greater this dependency will be. For example, if the weight of the error tolerated for a permutation matrix RP is n*Wa and if the average weight of each column of RP$^{-1}$ is two, then the weight of the error cannot exceed ½(1−√(2Wa−1))*n. In FIG. 4, the example is given in the case of a Reed-Muller code.

All the operations are matrix operations, the complexity is directly proportional to the quantity $u^2 \cdot (2^m - E)(\Sigma_{(i=0->i=r)} \text{Binomial}(i,m))$.

Figure 5:
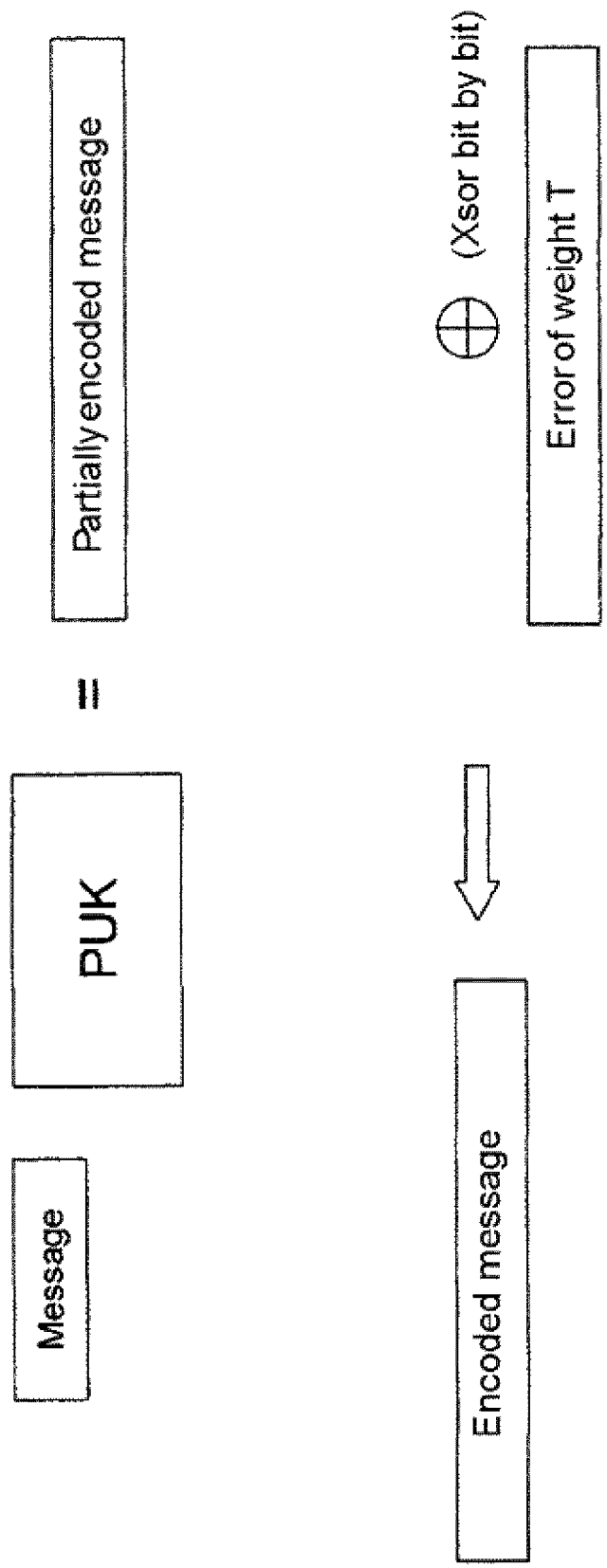

FIG. 5 represents an example of encoding or encryption of the information to be transmitted by using the key generated in FIG. 1. The message is encoded by using the public key PUK, then a random error of fixed weight is added, according to the scheme of FIG. 4, for example.

To optimize the information transmission security, the method adds, for example, additional dummy traffic before encrypting the information. A node of the network generates the traffic flow according to the space in the pass band.

According to an embodiment, a portion of the non-encoded information, for example, can be placed in the added error as described in: "Cryptosystèmes à clé publique basés sur les codes correcteurs d'erreurs" [Public key cryptosystems based on error correcting codes], Nicolas Sendrier, dissertation to obtain authorization to direct research, specialty: information technology, University of Paris 6, March 2002. This technique also appears in the document by V. M. Sidel'nikov, entitled "A public-key cryptosystem based on Reed-Muller codes", Discrete Mathematics and Applications, 4(3)191-207.

Figure 6:
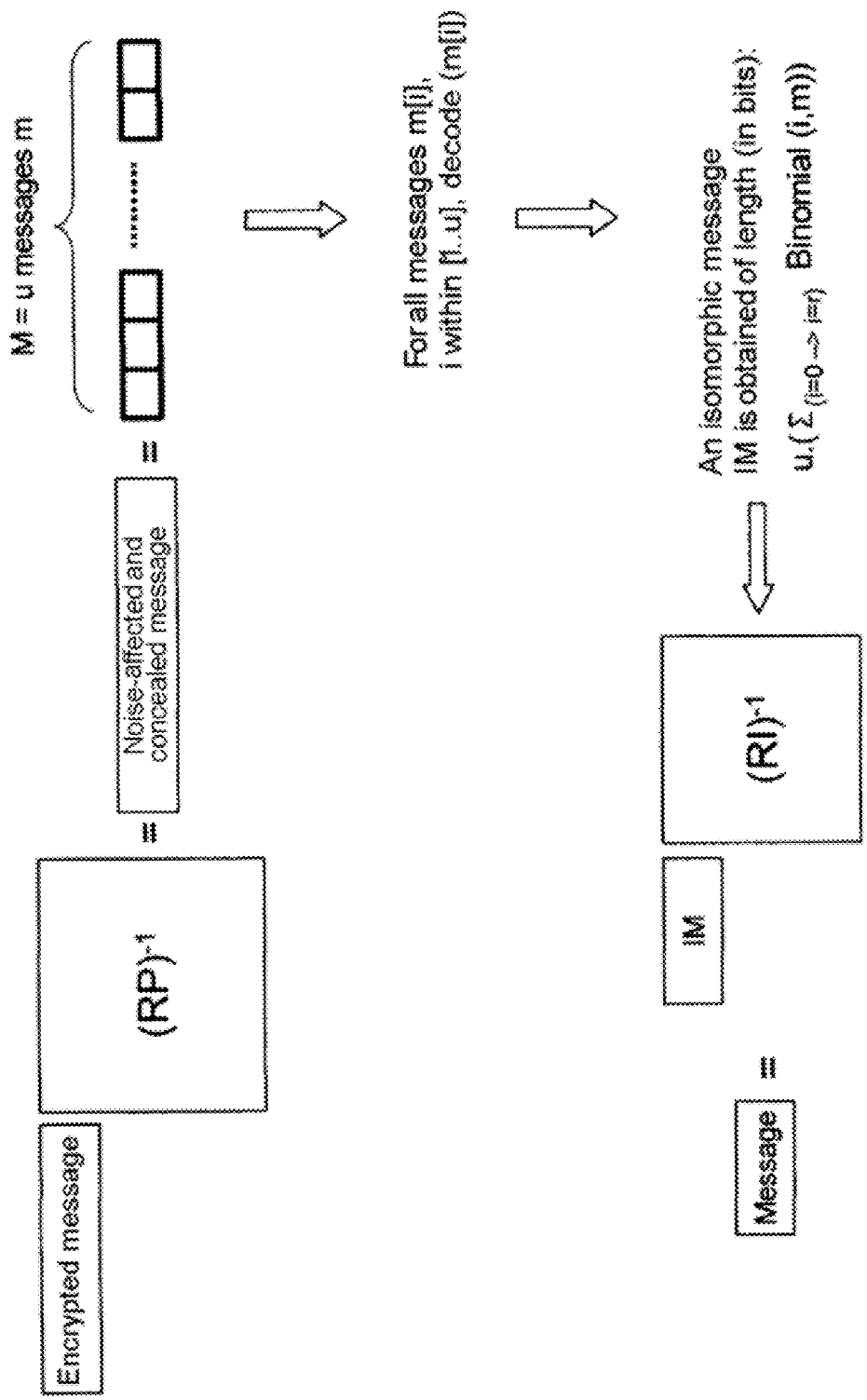

FIG. 6 represents an encrypted information decoding scheme according to the invention.

The encoded message is decoded initially by the private key by using the inverse matrix of RP; there are u messages m, then the method uses the decoding algorithm u times, for all the messages m[i] where i is an index varying from 1 to u (u being the size of the matrix), decode (m[i]). For the erased positions, the method executes the following steps: if I is an erased position, do M[i]=0 or else, do $M[i]=(-1)^{Tab[t]}$; t:=t+1; with Tab[t] which corresponds to the vector y defined previously, t is, for example, the position of a bit in a message to be encrypted.

More generally, t corresponds to the position of a component of the vector y t=t+1; the loop is executed for i within [0 . . . $u2^m-1$] where m is the parameter of the Reed-Muller code, $2^m$ is the length of the Reed-Muller code. The message obtained is isomorphic IM of length (in bits):

$$u \cdot (\Sigma_{(i=0- i=r)} \text{Binomial}(i,m)).$$

The method then applies the private key RI, by using its inverse matrix $(RI)^{-1}$ to obtain the decoded final message.

For the 2nd order Reed-Muller code: RM(2,m), it is well known that the errors of weight W are correctable with a high probability if $W < 2^{m-1}(1-\text{sqrt}(\log(4)(1+m+m(m-1)/2))/2^m)$. Furthermore, the difficulty in correcting an error is equivalent to the difficulty in correcting 2 erasures. For m=9, it is possible to correct approximately 150 errors if a simple and good candidate is desired, which is the code word closest to the noise-affected code word received. By using the abovementioned parameters, it is possible to correct 155 errors. The existing attacks on the McEliece encryption system are not applicable for the parameters. By using the following parameters: m=9, u=4, E=200, and a total number of errors equal to 220.

The inventive method uses techniques known to those skilled in the art for transmitting the public and private keys generated.

FIG. 7 diagrammatically represents an exemplary implementation of the method according to the invention in the case of two users in a network, Alice and Bob, wanting to communicate, where the network comprises a plurality of intermediate nodes. Alice A wants to transmit a message m to Bob B. Alice needs to find different paths for transmitting the information; she encodes the message by using the public key PUK generated according to the principle described hereinabove in relation to FIGS. 2 and 3. She also encodes the in address of the node of the final destination B. She then transmits the encoded message. Each node belonging to the path between the source A and the destination B has to decrypt the address of B with its private key PRK and encrypt the address with the public key of the next node, then the information can be is transmitted to this next node. When Bob receives a message, he uses his private key to decode the control information and the address of the node; when he receives all the packets of the unitary message, m, he decodes it by applying an algorithm known to those skilled in the art, for example that described in the document by I. Dumer, G. Kabatiansky and C. Tavernier, entitled "List decoding of Reed-Muller codes up to the Johnson bound with almost linear complexity", in Proc.ISIT 2006, Seattle, USA. This algorithm provides a deterministic decoding. Those skilled in the art can also use a probabilistic algorithm which corrects more errors, as described in the document by I. Dumer, entitled "Recursive decoding and its performance for low-rate Reed-Muller codes", *IEEE Trans. Inform. Theory*, vol. 50, pp. 811-823, 2004.

Without departing from the framework of the invention, the inventive method can be used in any wireless transmission system which requires a level of security in transmission. Any communication system demanding high security constraints can implement it. Any system demanding information to be secured can implement the inventive method.

The information encoding method according to the invention is particularly fast.

It can be used in the banking field to transmit information or to exchange information that has to be protected between a plurality of users in a network.

The invention claimed is:

1. A method of encoding information by use of a public key encryption system, the information circulating in a network comprising at least one information transmitting node and one recipient node, wherein:
    RI comprises a random invertible matrix used to form a first private key;
    NG comprises a public key generation matrix having a plurality of elements G arranged as u columns and u rows, wherein each element G comprises a code generation matrix; and
    RP comprises a matrix obtained by random permutation used to form a second private key; and the method comprises the steps of:
    generating a public key by performing the steps of:
        eliminating one or more predetermined columns of the public key generation matrix NG in order to reduce the size of the matrix NG;
        calculating a block matrix multiplication of RI with NG, to produce an intermediate product;
        calculating a matrix multiplication of the intermediate product with RP, to produce the public key;
        encoding information transmitted in the network by use of the public key and at least one of the first and second private keys; and
        transmitting the encoded information over the network.

2. The method as claimed in claim 1, wherein the matrix RP comprises an invertible matrix, constructed by performing the steps of:
    drawing randomly a permutation matrix having a predetermined dimension MA;
    adding a matrix having dimension MA, the matrix comprising a plurality of column vectors, each column vector comprising a plurality of elements, such that number of non-zero elements in each column vector is less than or equal to a security factor Pv.

3. The method as claimed in claim 1, wherein:
a number of columns eliminated in the matrix NG is the same in all blocks forming the matrix NG; and
a number of columns to be eliminated is determined from the decoding algorithm used to receive the information.

4. The method as claimed in claim 1, further comprising the steps of:
evaluating a capacity of a transmission channel of the network by use of information circulating in the transmission channel; and
if a quality of the transmission channel meets a predetermined criterion, adding a random error of fixed weight to the information.

5. The method as claimed in claim 4, wherein a portion of the information to be encrypted is incorporated into the random error added before the encoding step.

6. The method as claimed in claim 1, wherein the code generation matrix G comprises a Reed-Muller code.

7. The method as claimed in claim 1, wherein, to decode the encoded information, the method further comprises the steps of:
decoding the encoded message initially by the second private key by use of an inverse matrix of RP;
repeating the decoding step u times for each of the u messages m;
decoding messages m[i] for index i varying from 1 to u; and
applying the first private key RI, by using its inverse matrix $(RI)^{-1}$ to obtain a decoded final message.

8. The method as claimed in claim 1, wherein, to decode the encoded information, the method further comprises steps of:
decoding the encoded message initially by the second private key by use of an inverse matrix of RP;
repeating the decoding step u times for each of u messages m;
decoding messages m[i] for index i varying from 1 to u;
for each of the eliminated columns, for i within the range $[0 \ldots u2^m-1]$ where m is the parameter of the Reed-Muller code, and $2^m$ is the length of the Reed-Muller code, execute the steps of:
if i corresponds to an eliminated column, setting m[i]=0;
if i does not correspond to an eliminated column, then setting m[i]=$(-1)^{Tab[t]}$, wherein Tab[t] corresponds to a predetermined vector; and
incrementing t by a value of one; and
applying the first private key RI, by using its inverse matrix $(RI)^{-1}$ to obtain the decoded final message.

\* \* \* \* \*